United States Patent Office 3,506,698
Patented Apr. 14, 1970

3,506,698
PREPARATION OF THIOLHYDROXAMATE CARBAMATES
Arthur G. Jelinek, Wilmington, Del., assignor to E. I. du Pont de Nemours and Company, Wilmington, Del., a corporation of Delaware
No Drawing. Filed Feb. 9, 1967, Ser. No. 614,803
Int. Cl. C07c *119/12, 131/100*
U.S. Cl. 260—453        6 Claims

ABSTRACT OF THE DISCLOSURE

Reaction of thiolhydroxamate esters such as methyl thiolacetohydroxamate esters with a carbamylating agent such as isocyanic acid or its methyl ester in an aqueous medium at a temperature of between 0° C. and the boiling point of the reaction mass, to obtain the corresponding thiolhydroxamate carbamates.

BACKGROUND OF THE INVENTION

This application relates to an improvement in the preparation of thiolhydroxamate carbamates, and more particularly is directed to an improvement in the preparation of thiolhydroxamate carbamates of the following formula;

(1) 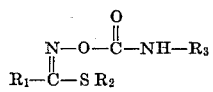

wherein $R_1$ is methyl, ethyl, methoxymethyl or (methylthio) methyl;
$R_2$ is methyl, ethyl or propyl; and
$R_3$ is hydrogen or methyl;

by reaction of a thiolhydroxamate ester of the following formula (2) 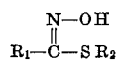

wherein $R_1$ and $R_2$ are as in Formula 1;

with a carbamylating agent selected from the group consisting of isocyanic acid and its methyl ester; the improvement comprising carrying out the reaction in an essentially aqueous reaction medium at a temperature between 0° C. and the boiling point of the reaction mass.

It is well established in the prior art that isocyanic acid and methyl isocyanate in aqueous systems will react preferentially with amines. Recently it has been shown [Zinner, Arch. Pharm. 292, 1–9 (1959)] that isocyanic acid produced by the reaction of HCl with potassium isocyanate will react in an aqueous solution with acetone oxime. However, thiolhydroxamates are neither amines nor oximes, and the reaction of isocyanic acid or methyl isocyanate with thiolhydroxamates preferentially when in an aqueous medium is thoroughly unexpected and surprising. It would be expected by those skilled in the art that the isocyanic acid or methyl isocyanate would react rapidly with water to form eventually $CO_2$ and either ammonia or methylamine.

The discovery that water could be used as a reaction medium for preparation of thiolhydroxamate carbamates is a particularly useful one for several reasons. The use of water is economically attractive because it is low in cost and need not be recovered for recycle. Use of water offers a substantial reduction in safety hazards such as fire or toxicity when compared to use of such aromatic solvents as benzene, toluene, or xylene or chlorinated hydrocarbons such as chloroform or methylene chloride. When isocyanic acid is to be used as the carbamylating agent water offers the advantage of convenience in generating the acid in situ. Regardless of which carbamylating agent is to be used, the use of water has the distinct advantage of making it unnecessary to isolate the starting thiolhydroxamate ester from an aqueous system in which it may be prepared such as disclosed in copending application Ser. No. 602,125 filed Dec. 16, 1966.

SUMMARY

This invention is directed to an improvement in the process for preparing thiolhydroxamate carbamates of Formula 1 by reaction of the corresponding thiolhydroxamate ester with a carbamylating agent selected from the group consisting of isocyanic acid or methyl isocyanate, the improvement comprising carrying out the reaction in an essentially aqueous medium at a temperature between 0° C. and the boiling point of the reaction mass.

The products of this process are extremely useful as insecticides as described in co-pending application Ser. No. 602,134 filed Dec. 16, 1966, now abandoned.

DESCRIPTION OF PREFERRED EMBODIMENTS

As stated previously this invention is directed to an improvement in a process for the preparation of thiolhydroxamate carbamates. The suitable reactants and reaction conditions are set out below.

Reactants

In the process of this invention the reactants fall into two classes, thiolhydroxamate esters of Formula 2 above, and the carbamylating agents, isocyanic acid and its methyl ester.

The thiolhydroxamate esters suitable for use in this reaction are those of Formula 2 and are generally speaking soluble in water. They can be prepared in the manner set out in Ber., 27, 2197 (1894) by reaction of an aldoxime with chlorine in an inert solvent to form the corresponding hydroxamoyl chloride followed by reaction of the latter in aqueous solution with an alkali metal salt of an alkyl mercaptan. They can also be prepared by the methods set forth in co-pending application Ser. No. 602,125 referred to above.

Suitable carbamylating agents are isocyanic acid or methyl isocyanate. Isocyanic acid $HN=C=O$, is frequently referred to as cyanic acid, which is more properly written $HOC\equiv N$. These two tautomers are rapidly inter-convertible, either in the liquid acid or in a solution. As indicated in the literature, the acid exists as an equilibrium mixture which contains mostly the isocyanate form. See Noller, Chemistry of Organic Compounds, Saunders, (1965), p. 337. Therefore, when the term isocyanic acid is used herein it ordinarily refers to an equilibrium mixture of isocyanic and cyanic acids. The carbamylating agent can be obtained commercially or it can be prepared by any of the suitable means well known to the art. As mentioned above, the isocyanic acid can be generated in situ by addition to the thiolhydroxamate ester and water of an alkali metal isocyanate and a mineral acid.

While the reaction is carried out in an essentially aqueous system to obtain the advantages enumerated above, it can be carried out in a system which consists of at least 50% water and up to 50% of a miscible organic solvent. Suitable miscible solvents such as acetone, methanol, and ethanol will be readily apparent to those skilled in the art.

Reaction Conditions

The process of this invention as stated above is carried out in an essentially aqueous reaction medium. This medium can contain inorganic salts resulting from the synthesis of the thiolhydroxamate ester which have not been separated out prior to commencing the process of this invention. It is not necessary that a sufficient quantity of water be present in the reaction mass to keep these salts in solution during reaction. However, to prevent contamination of the thiolyhydroxamate carbamate product, the amount of water present is preferably adjusted prior to isolation of the product so that the salt concentration is below saturation. If some salt is crystallized out with the ultimate product it can be removed of course by washing or other purification procedures well known to those skilled in the art. If the starting thiolhydroxamate ester is the pure compound, isolated prior to commencing the reaction of this invention, there will of course be no salt or other impurities present.

The concentration of the thiolhydroxamate esters in the aqueous medium is not critical to the process of this invention. Extremely low concentrations are economically undesirable, and extremely high concentrations make agitation difficult when a physical slurry results. Therefore for reasons of convenience and economy, the thiolhydroxamate ester concentration will ordinarily range between 5–50% based on the total weight of aqueous medium and the thiolhydroxamate ester. For reasons of optimum economy and operability a preferred concentration is between 10 and 30% of thiolhydroxamate ester based on total weight of aqueous medium and thiolhydroxamate ester.

The carbamylating agent is generally used in an amount such that the mole ratio of carbamylating agent to thiolhydroxamate ester is between 1.0:1 and 1.4:1 with a preferred range of 1.0:1 to 1.2:1 moles of carbamylating agent per mole of thiolhydroxamate ester. Of course it is possible to operate outside these ranges and some advantages such as purity of product are attendent to operating with a mole ratio of less than 1.0:1. However, generally, for reasons of economy and convenience, the mole ratio will be in the range first mentioned above.

The reactants and aqueous medium can be intermixed in any order, however, it is ordinarily preferred to introduce the thiolhydroxamate ester into the aqueous medium followed by the addition of the carbamylating agent. When the carbamylating agent is methyl isocyanate it can be added directly to the reaction mass either as a liquid or a gas. When the cabamylating agent is isocyanic acid it can be added as isocyanic acid or it can be generated in situ by adding to the reaction mass an alkali metal cyanate and a mineral acid. Such addition will ordinarily be made at such a rate that the isocyanic acid will be generated gradually and reacted with the thiolhydroxamate ester.

In one of the preferred embodiments of this invention an alkali metal cyanate and a mineral acid are added concurrently to a thiolhydroxamate ester in an aqueous solvent mixture at a temperature between 0° and 25° C.

The process is ordinarily operated at a temperature between about 0° C. and the boiling point of the solution. While reaction temperatures are not critical, as will be recognized by those skilled in the art, temperatures below 0° C. are inconvenient, requiring cooling equipment and involving higher operating costs. As a general rule the reaction temperature will range between 0° C. and 60° C., with a preferred temperature range of 0 to 25° C. when the carbamylating agent is isocyanic acid. When the carbamylating agent is methyl isocyanate the preferred temperature range is between 20–60° C.

The reaction mass will ordinarily be agitated during the addition of the reactants and until the reaction is completed. The intensity of agitation is not critical and only mild agitation is desired.

The products of the reaction can be islated by conventional procedures such as crystallization and filtration or extraction and solvent evaporation.

In a hatch process, addition times for the carbamylating agent normally will range from about one-half hour or less to three hours or more depending on such factors as batch size and heat transfer area. Relatively short addition times are desirable but when methyl isocyanate is the carbamylating agent the addition rate should not be so rapid than an appreciable amount of the isocyanate exists in the reactor as a second phase. The reaction ordinarily proceeds quite rapidly and in a batch process is generally essentially complete when the addition of the isocyanate is finished although hold periods of up to 30 minutes or more can be employed as desired. As will be evident to those skilled in the art the process can be operated as a continuous process without departing from the concept of this invention.

The process of the invention is illustrated by the following examples. Parts and percentages are by weight unless otherwise specified.

EXAMPLE 1

A mixture of solids containing 675 parts of methyl thiolacetohydroxamate and 550 parts of KCl is added to 7500 parts of water. Moderate agitation is established and the temperature of the resulting slurry is adjusted to 5° C. Over a period of one hour, 595 parts of solid technical KNCO (about 97% pure) and 705 parts of 37% aqueous HCl are simultaneously added to the thiolhydroxamate slurry. The KNCO and HCl are added at reasonably uniform rates and are kept approximately in stoichiometric balance. During the addition the reaction mass is cooled to maintain a temperature of between 5 and 10° C. Upon completion of the KNCO-HCl addition, the resulting slurry is cooled to 2° C. The solids are filtered off, washed with 1000 parts of ice water and dried. An excellent yield of methyl O-carbamylthiolacetohydroxamate, M.P. 102–103° C., is obtained.

EXAMPLE 2

Sixty-four parts of methyl isocyanate is added to a mixture of 105 parts of methyl thiolacetohydroxamate and 220 parts of water. The addition is made at a constant rate over a period of twenty minutes with good agitation. The temperature, which is initially at 20° C., is allowed to rise to 35° C. during the early part of the addition but is prevented from rising higher by external cooling. After the evolution of heat has subsided, the mixture is warmed to 50–55° C. and held for thirty minutes. Following this hold period the mixture is cooled to 2° C. and held at this temperature for thirty minutes. During the cooling cycle the product begins to crystallize. The solids are then filtered off, washed with a small amount of ice water, and dried. The product, methyl O-(methylcarbamyl) thiolacetohydroxamate, M.P. 77–79° C., is obtained in excellent yield.

EXAMPLE 3

Forty-five parts of methyl thiolacetohydroxamate are added to 450 parts of water. Good agitation is established and then 36 parts of solid KNCO is added to the thiolhydroxamate mixture. The temperature is then adjusted to 25° C. and 43.5 parts of 37% HCl is added over a period of ten minutes while maintaining the temperature at 25° C. The resulting mixture is cooled to 5° C. over a period of twenty minutes, during which crystals form. The solids are then filtered, washed with a small amount of ice water, and dried. A good yield of methyl O-carbamylthiolacetohydroxamate, M.P., 101.5–103° C., is obtained.

EXAMPLE 4

To a stirred vessel is charged the aqueous reaction mass from a preceding chemical step, which reaction mass contains 74 parts by weight of methyl thiolacetohydroxamate, 315 parts of water, 103 parts of NaCl and approximately 15 parts of miscellaneous organic by-products. Starting at ambient temperature, 48 parts of methyl isocyanate is added over a period of about one hour. During this addition the temperature is allowed to rise to 50° C. and is then maintained at that level by cooling the reactor. Upon completion of the isocyanate addition the aqueous mixture is held for fifteen minutes at 50° C. and then is cooled to 5° C. The solids which crystallize out are filtered, washed with cold water and dried, giving the methyl O-(methylcarbamyl)thiolaceto-hydroxamate in good yield.

EXAMPLE 5

Six parts of methyl isocyanate is added over a period of one-half hour to a well stirred mixture of 13.7 parts of methyl 2-methoxythiolacetohydroxamate and 50 parts water. The temperature of the mixture is maintained at 15° C. during the addition and then is allowed to rise to 25° C. while stirring. The product, methyl O-(methyl-carbamyl)-2-methoxythiolacetohydroxamate, separates as a heavy oil which can be rectified by conventional processes.

EXAMPLE 6

A mixture of 133 parts ethyl thiolpropionohydroxamate and 300 parts of a 25% aqueous solution of methanol is stirred and cooled to 15° C. Then simultaneously 107 parts of 37% hydrochloric acid and a saturated aqueous solution containing 70 parts of sodium cyanate are added while maintaining the temperature at 15°±5° C. Stirring is continued for one-half hour and then the solid product is removed by filtration. Recrystallization of the product gives ethyl O-carbamylthiolpropionohydroxamate melting at about 99° C.

EXAMPLE 7

To a stirring mixture containing 10.5 parts of methylthiolhydroxamate, 40 parts of water and 10 parts of ethanol, 6 parts of methyl isocyanate is added over a period of ten minutes. The temperature spontaneously rises from ambient to about 40° C. Stirring is continued for 30 minutes while cooling the mixture to 25° C. The solution is then transferred to a suitable flask and most of the alcohol is removed at reduced pressure by stripping at 15 mm. of mercury. Crystallization occurs and the solids are isolated by filtration. Methyl O-(methylcarbamyl)-thiolacetohydroxamate, M.P. 78–80° C., is obtained in high yield.

EXAMPLE 8

Fifteen parts of methyl(2-methylthio)thiolacetohydroxamate are stirred in 100 parts of a 35% solution of acetone in water. Over a period of twenty minutes, 7 parts of methyl isocyanate is added while maintaining the temperature at 30° C. Stirring is continued while the reaction mass is cooled to 25° C. Evaporation of most of the acetone results in a slurry of crude product, which is recrystallized from a benzene-pentane mixture to give methyl O - (methylcarbamyl) - (2-methylthio)thiolacetohydroxamate melting at 58° C.

What I claim is:

1. In the process for preparing thiolhydroxamate carbamates of the formula

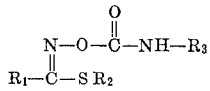

wherein $R_1$ is methyl, ethyl, (methylthio)methyl, or methoxymethyl;

$R_2$ is methyl, ethyl or propyl; and $R_3$ is hydrogen or methyl;

by reaction of a thiolhydroxamate ester of the formula

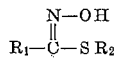

wherein $R_1$ and $R_2$ are as defined above with isocyanic acid or methyl isocyanate, the improvement comprising carrying out the reaction in a reaction medium which consists of at least 50% water and up to 50% of a miscible organic solvent at a temperature between 0° C. and the boiling point of the reaction mass, the initial concentration of the thiolhydroxamate ester being between 5 and 50% based on the total weight of ester and reaction medium.

2. The process of claim 1 wherein the initial concentration of the thiolhydroxamate ester is between 10 and 30% by weight.

3. The process of claim 1 wherein the methyl isocyanate or isocyanic acid is added to the reaction mass comprising the thiolhydroxamate ester and reaction medium in an amount such that the mol ratio of isocyanic acid or methyl isocyanate to thiolhydroxamate ester is between 1.01:1 and 1.4:1.

4. The process of claim 3 wherein the initial concentration of the thiolhydoxamate ester is between 10 and 30% by weight.

5. The process of claim 1 wherein the isocyanic acid is generated in situ by addition to the thiolhydroxamate ester of an alkail metal cyanate and a mineral acid.

6. The process of claim 4 wherein the reaction is carried out at a temperature between 0° and 25° C.

References Cited

UNITED STATES PATENTS 3,217,037 11/1965 Payne et al. _____ 260—453 X
3,223,733 12/1965 Heiss et al. _____ 260—566
3,231,599 1/1966 Kilsheimer et al. __ 260—566 X

OTHER REFERENCES

Zinner, Archiv der Pharmazie und Berichte der Deutchen Pharmazeutchen Gesellschaft, 292, 64 Band, Heft 1, pp. 1–9 (1959).

Shell Int., "Oxime Carbamates," Fine Chemicals Patents Journal., vol. 7, No. 49, (1967).

CHARLES B. PARKER, Primary Examiner

D. R. PHILLIPS, Assistant Examiner

U.S. Cl. X.R.

260—566